(12) United States Patent
Kolp et al.

(10) Patent No.: US 9,902,231 B2
(45) Date of Patent: Feb. 27, 2018

(54) TWIST BEAM WITH WATT LINKAGE FOR DRIVEN REAR AXLE

(71) Applicant: GM Global Technology Operations LLC, Detroit, MI (US)

(72) Inventors: Scott A. Kolp, Clarkston, MI (US); Gregory K. Peterson, South Lyon, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 120 days.

(21) Appl. No.: 14/968,196

(22) Filed: Dec. 14, 2015

(65) Prior Publication Data
US 2017/0166029 A1 Jun. 15, 2017

(51) Int. Cl.
*B60G 21/05* (2006.01)
*B60K 17/00* (2006.01)
*B62D 63/04* (2006.01)

(52) U.S. Cl.
CPC ......... *B60G 21/051* (2013.01); *B60K 17/00* (2013.01); *B62D 63/04* (2013.01); *B60G 2200/21* (2013.01); *B60G 2200/342* (2013.01); *B60G 2200/446* (2013.01); *B60G 2202/136* (2013.01); *B60G 2204/1434* (2013.01); *B60G 2204/421* (2013.01); *B60G 2204/422* (2013.01)

(58) Field of Classification Search
CPC ........... B60G 2200/342; B60G 21/051; B60G 2200/446
See application file for complete search history.

(56) References Cited

U.S. PATENT DOCUMENTS

| | | | | |
|---|---|---|---|---|
| 4,589,677 A * | 5/1986 | Matschinsky | ............ | B60G 9/00 180/905 |
| 4,865,350 A * | 9/1989 | Yamamoto | ............... | B60G 7/02 180/359 |
| 5,064,018 A * | 11/1991 | Encke | ................... | F16F 3/0873 180/360 |
| 5,511,817 A * | 4/1996 | Kasahara | ................. | B60G 3/20 267/276 |
| 5,813,691 A * | 9/1998 | Aoki | .................... | B60G 21/051 280/124.106 |
| 6,631,914 B2 * | 10/2003 | Kawamura | ............. | B60G 3/24 180/381 |
| 2006/0237938 A1 * | 10/2006 | Imre | ........................ | B60G 3/24 280/124.116 |
| 2010/0052281 A1 * | 3/2010 | Bitz | ..................... | B60G 21/051 280/124.106 |

(Continued)

*Primary Examiner* — James A English
(74) *Attorney, Agent, or Firm* — Cantor Colburn LLP

(57) ABSTRACT

A suspension system for a vehicle is provided. The vehicle comprises a pair of rear wheels and a prop-shaft. A rear drive unit is operably coupled between the prop-shaft and the pair of rear wheels, the rear drive unit being configured to transmit torque from the prop-shaft to the pair of rear wheels. A twist-beam structure is provided having a first trailing arm and a second trailing arm. Each of the trailing arms is operably coupled to one of the pair of rear wheels. The twist-beam structure further comprising a curved beam member extending between the trailing arms, the curved beam member having a center portion disposed offset from the prop-shaft. A Watt linkage includes a first link coupled to the first trailing arm and a second link coupled to the second trailing arm.

16 Claims, 4 Drawing Sheets

(56) References Cited

U.S. PATENT DOCUMENTS

| | | | |
|---|---|---|---|
| 2010/0205806 A1* | 8/2010 | Oprea | B60G 9/025 29/897.2 |
| 2012/0217716 A1* | 8/2012 | Ehrlich | B60G 21/051 280/124.128 |
| 2012/0306176 A1* | 12/2012 | Zandbergen | B60G 9/025 280/124.106 |
| 2013/0099462 A1* | 4/2013 | Ehrlich | B60G 21/051 280/124.116 |

\* cited by examiner

TWIST BEAM WITH WATT LINKAGE FOR DRIVEN REAR AXLE

FIELD OF THE INVENTION

The subject invention relates to a vehicle having a twist-beam rear axle, and more particularly, to a vehicle having driven rear wheels supported by a twist-beam rear axle.

BACKGROUND

Vehicles, such as automobiles and trucks for example, include a driveline having a prop-shaft that connects with a rear differential assembly. The rear differential assembly, sometimes colloquially referred to as a rear drive unit, transfers torque from the prop-shaft to the rear wheels. The rear wheels are connected to the vehicle body by a suspension assembly. One type of suspension is referred to as a twist-beam suspension.

A twist-beam rear suspension is a type of suspension having a trailing arm on each side of the vehicle connected by a cross-beam. The front portion of trailing arm couples to the body or chassis of the vehicle while a rear portion of the trailing arm supports the wheel. A cross-beam of the twist axle connects the two trailing arms and provides lateral and roll stiffness.

Due to space constraints, some rear-wheel drive vehicles use a different type of suspension, referred to as an independent suspension. In an independent suspension system, each rear wheel is allowed to move independently from the opposing wheel. In this arrangement there is no cross-member that interferes with other components, such as the prop-shaft. Generally, the independent suspension systems are more costly and complex than the twist-beam suspensions. However, in some applications this suspension is desirable as it provides additional space for other vehicle components, such as the drivetrain for example.

Accordingly, while existing vehicle suspension systems are suitable for their intended purposes the need for improvement remains, particularly in providing a suspension system for a rear-wheel drive vehicle with improved lateral stiffness and ride comfort, at a reduced cost and complexity.

SUMMARY OF THE INVENTION

In one exemplary embodiment of the invention, a vehicle is provided. The vehicle comprises a pair of rear wheels and a prop-shaft. A rear drive unit is operably coupled between the prop-shaft and the pair of rear wheels, the rear drive unit being configured to transmit torque from the prop-shaft to the pair of rear wheels. A twist-beam structure is provided having a first trailing arm and a second trailing arm. Each of the trailing arms is operably coupled to one of the pair of rear wheels. The twist-beam structure further comprising a curved beam member extending between the trailing arms, the curved beam member having a center portion disposed offset from the prop-shaft. A Watt linkage positioned opposite the curved beam member from the rear drive unit, the Watt linkage having a first link coupled to the first trailing arm and a second link coupled to the second trailing arm.

In another exemplary embodiment of the invention, a suspension for non-steered wheels on a vehicle is provided where the vehicle includes a body and an engine. The vehicle further having a prop-shaft disposed between the engine and a rear drive unit. The suspension comprises a first trailing arm configured to mount to the body, the first trailing arm having a first portion on one side of a first mounting for a first non-steered wheel and a second portion on the other side of the first non-steered wheel. A second trailing arm is configured to mount to the body, the second trailing arm having a third portion on one side of a second mounting for a second non-steered wheel and a fourth portion on the other side of the second non-steered wheel. A beam member is coupled between the first portion and the third portion, the beam member having a curved shape with a center portion disposed away from a ground plane relative to ends of the beam member, the curved shape being sized to provide space for the prop-shaft to extend from the engine to the rear drive unit. A Watt linkage is provided having a first link rotationally coupled to the second portion and a second link rotationally coupled to the fourth portion.

In another exemplary embodiment of the invention, a vehicle is provided. The vehicle comprises a body and an engine operably coupled to the body. A pair of rear wheels is provided. A prop-shaft is coupled to receive torque from the engine. A rear drive unit is disposed between the prop-shaft and the pair of rear wheels, the rear drive unit being configured to transfer torque from the prop-shaft to the pair of rear wheels. A twist-beam suspension is operably coupled to the body, the pair of rear wheels and the rear drive unit. The twist-beam suspension having a first trailing arm, a second trailing arm and a curved beam member disposed therebetween, the curved beam member being shaped to provide space for the prop-shaft to couple to the rear drive unit. The twist-beam suspension further includes a Watt linkage having a first link coupled to the first trailing arm and a second link coupled to the second trailing arm.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
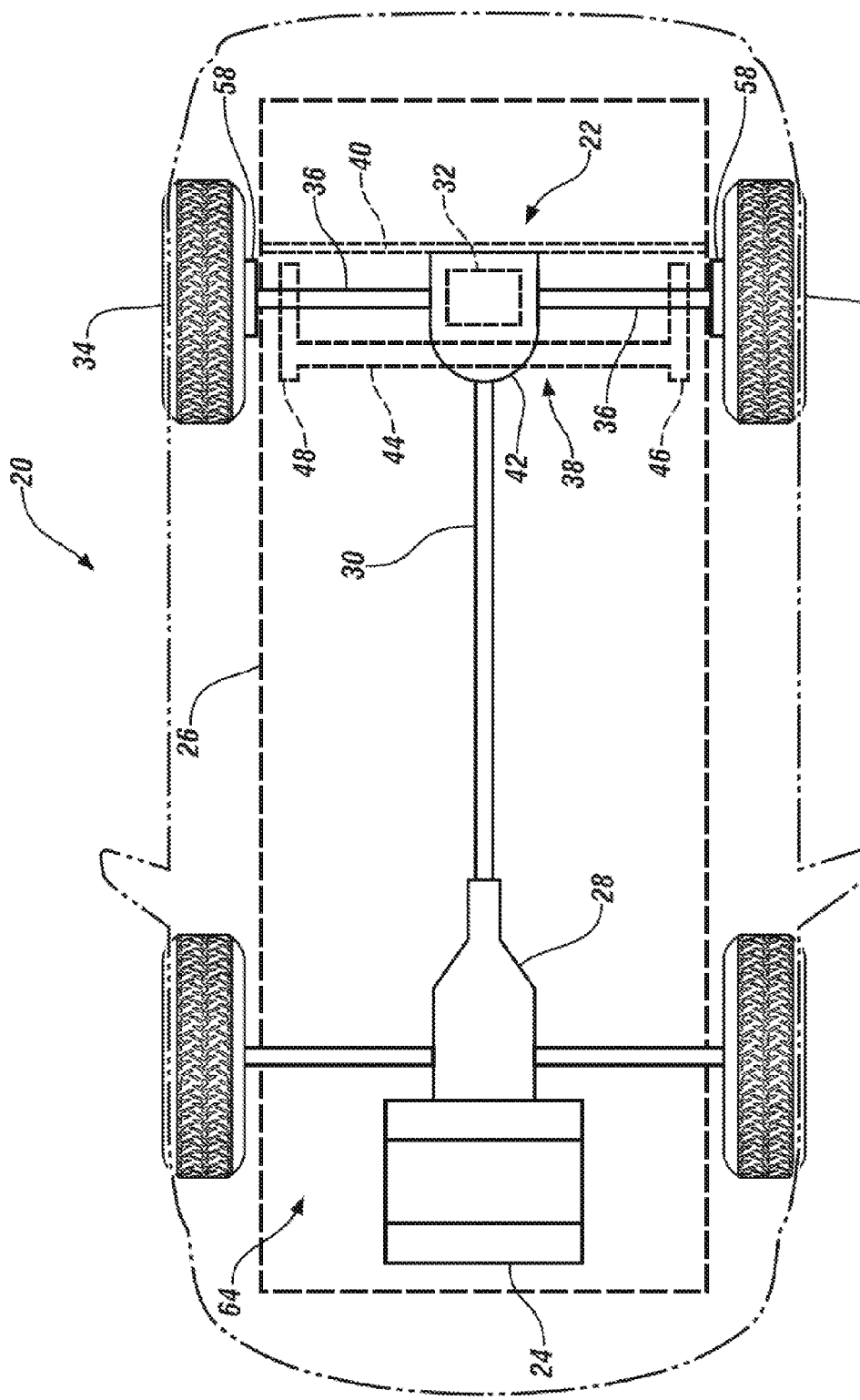
FIG. 1 is a schematic plan view of a vehicle having a twist-beam suspension in accordance with an embodiment of the invention.

The following description is merely exemplary in nature and is not intended to limit the present disclosure, its application or uses. It should be understood that throughout the drawings, corresponding reference numerals indicate like or corresponding parts and features.

In accordance with an embodiment of the invention, FIG. 1 illustrates a vehicle 20 having a front drive unit 64 and rear drive unit (RDM) 22. It should be appreciated that the vehicle 20 may be an automobile or a truck for example. The vehicle 20 may include an engine 24, such as a gasoline or diesel fueled internal combustion engine. The engine 24 may further be a hybrid type engine that combines an internal combustion engine with an electric motor for example.

The engine 24 and drive units 22, 64 are coupled to a vehicle structure such as a chassis or body 26. The engine 24 is coupled to the RDM 22 by a transmission 28 and a prop-shaft 30. The RDM 22 transmits the output torque from the prop-shaft 30 to a pair of non-steered driven-wheels 34 via axles 36 and wheel flanges 58.

In one embodiment, the RDM 22 includes a housing 42 such as a differential housing that supports a hypoid gear set 32. The housing 42 is coupled to the body 26 by a cross member 40 that extends transverse to the longitudinal axis of the vehicle 20.

Figure 2:
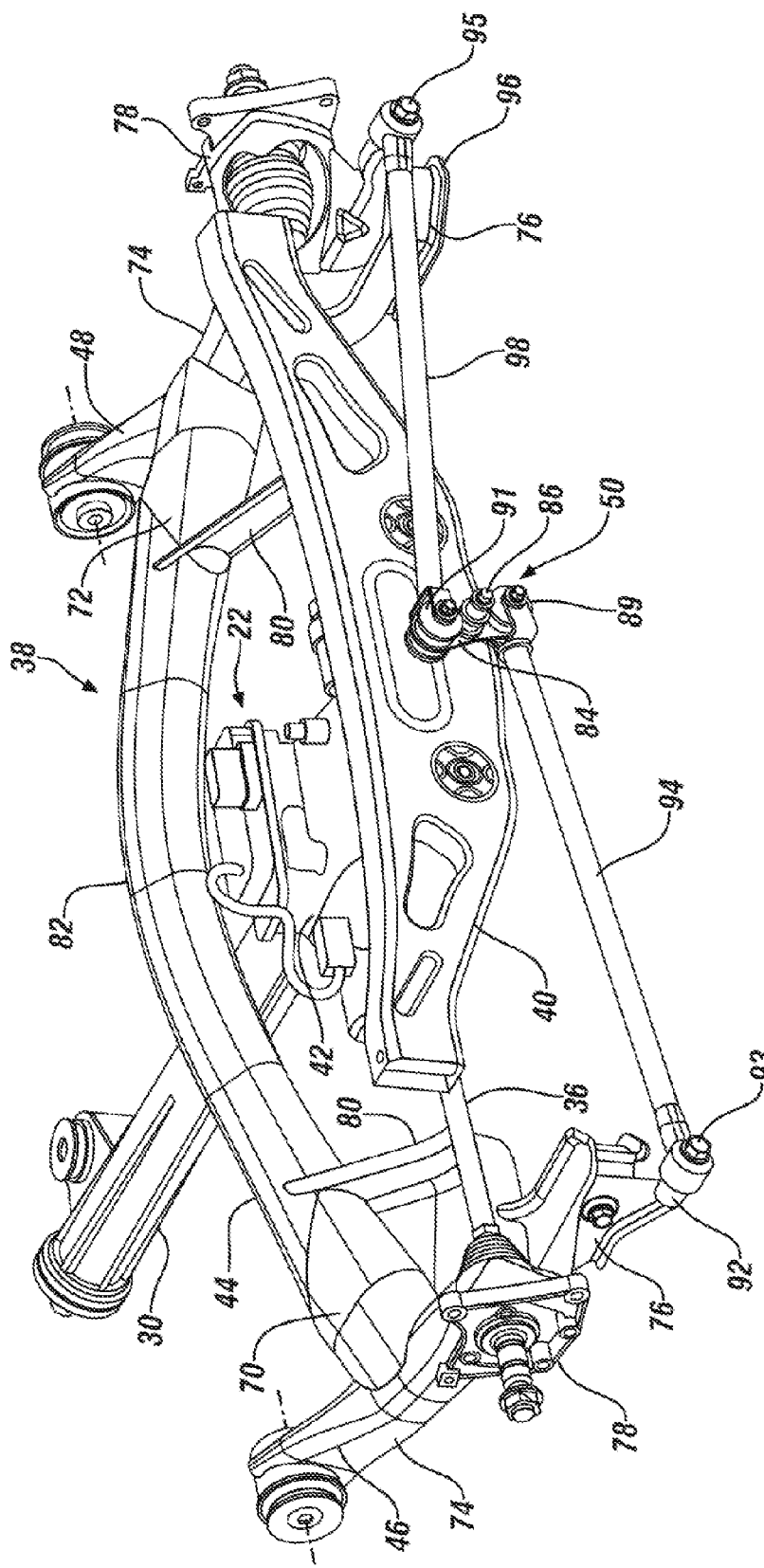
FIG. 2 is a perspective view of a portion of the vehicle of FIG. 1.
Figure 3:
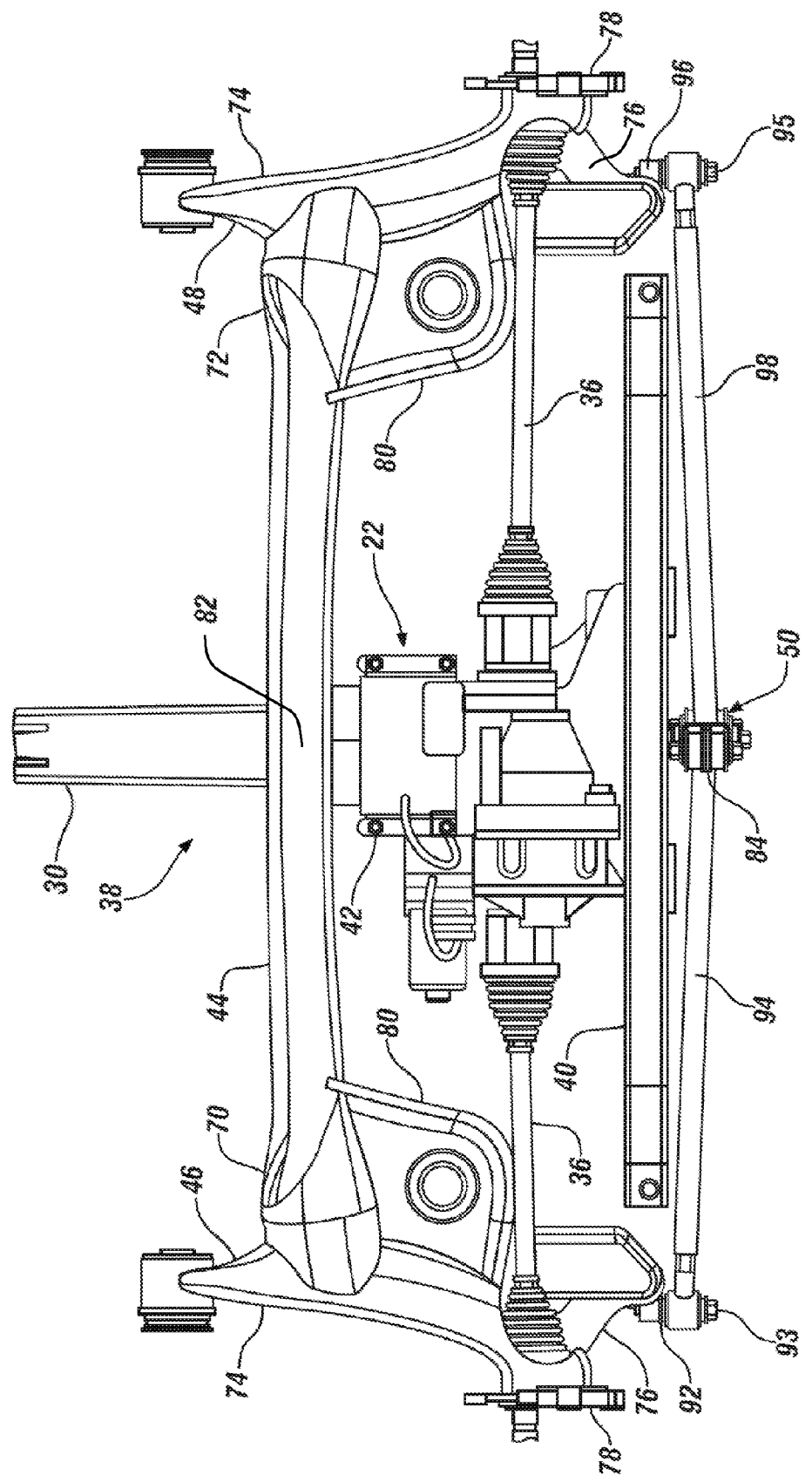
FIG. 3 is a plan view of the portion of the vehicle of FIG. 2.
Figure 4:
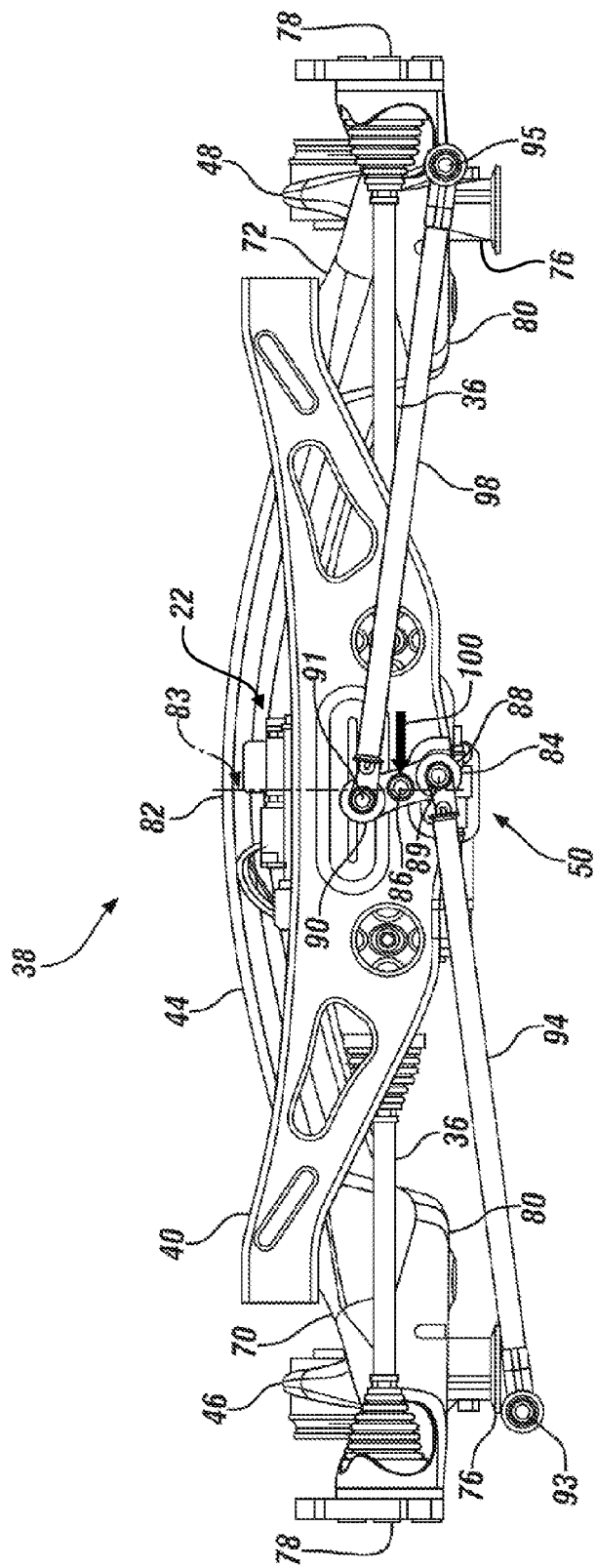
FIG. 4 is a rear view of the portion of the vehicle of FIG. 2.

Referring now to FIGS. 2-4 with continuing reference to FIG. 1, an exemplary suspension system 38 is shown for coupling the rear driven wheels 34 to the body 26. The suspension system 38 includes a twist-beam member 44 having a first trailing arm 46 and a second trailing arm 48. In the exemplary embodiment, the ends 70, 72 of the twist beam member 44 are welded to the respective trailing arms 46, 48 to form a unitary member. The trailing arms 46, 48 each include a first portion 74 and a second portion 76 arranged on either side of a mounting portion 78 that is adapted to couple with the wheels 34 and axles 36. In the exemplary embodiment, the twist-beam member 44 is coupled to the first portion 74 of each trailing arm 46, 48. In one embodiment, a spring support bracket 80 is coupled, such as through welding for example, between the twist-beam member 44 and the first portion 74. The twist beam member 44 and trailing arms 46, 48 cooperate to couple the wheels 34 to the body 26. Such as through a spring and a damping member (not shown) as is known in the art. In one embodiment, the spring is coupled between the bracket 80 and the body 26 while the damping member is coupled between the second portion 76 and the body 26.

The twist-beam member 44 has an arcuate or curved shape. The size and curvature of the twist-beam member 44 is sized or configured to create a space to allow the prop-shaft 30, or a portion of the rear drive unit 22 to be positioned thereunder. In other words, the ends 70, 72 are closer to the ground than a center portion 82. This allows the center portion 82 to be offset in a direction away from the ground from the prop-shaft 30. As used herein, the ground or ground plane is the surface upon which the rear wheels 34 rest or operate. It should be appreciated that the use of the curved twist-beam member 44 allows the twist beam suspension 38 to be used at a lower cost and complexity than would otherwise be achieved in a rear-wheel driven vehicle having an independent suspension system.

Traditional curved twist-beam suspension systems have lower handling performance when compared with a suspension system having a straight twist-beam. The reason is that during operation the suspension system receives lateral forces from the wheels 34 that are reacted through the twist beam. Due to the curvature of the twist-beam, the reaction for the lateral forces is changed by the high center portion 82 to a position indicated by arrow 83 (FIG. 4). Further, due to the high shear center of the curved beam, the roll steer and roll center are also higher than with a straight twist-beam suspension. Both of these factors reduce the handling performance of the vehicle. Further, ride comfort for the occupants of the vehicle may be decreased since stiffer bushings are used to compensate for the reduced lateral stiffness.

To improve the lateral stiffness and lower the roll steer and roll center of the twist-beam suspension 38, a Watts linkage 50 is provided. The Watts linkage 50 includes a rocker arm 84 mounted by a pivot 86 to the cross member 40. The rocker arm 84 includes a first portion 88 and an opposing second portion 90 (FIG. 4). The rocker arm 84 first portion 88 is coupled to an end 92 of the first trailing arm 46 second portion 76 by a first link 94. Similarly, the rocker arm 84 second portion 90 is coupled to an end 96 of the second trailing arm 48 second portion 76 by a second link 98. It should be appreciated that the connections at the links 94, 98 are rotary connections that allow relative rotation between the links 94, 98, the second portions 76 and the rocker arm 84. These rotary connections may include bushings and other components as is known in the art.

In an exemplary embodiment, the rocker arm 84 is mounted to the cross member 40 centrally between trailing arms 46, 48 opposite the rear drive unit 22. In one embodiment, the axis of rotation of the pivot 86 is aligned in the same plane as the horizontal axis of the vehicle. In one embodiment, the ends 89, 91 of the links 94, 98 are vertically offset from each other (when viewed from the position of FIG. 4), the opposing ends 93, 95 are also vertically offset from each other. As used herein, the phrase "vertically offset" refers to being at different elevations from a horizontal plane (e.g. the ground plane) on which the vehicle is resting or operating. In one embodiment, due to this vertical offset, the angle of the links 94, 98 (relative to a horizontal plane) are substantially equal. This arrangement allows the motion and reaction force transmitted through the links to the trailing arms 46, 48 to also be substantially equal.

The Watts linkage 50 resists lateral force between the rear wheels and body of the vehicle 20. As a result, the primary lateral resistant force path is lowered (relative to the ground plane) from the center of the curved twist-beam member 44 (the location by arrow 83) to the linkage and centerline of the pivot 86 as represented by arrow 100 (FIG. 4). The lateral stiffness is increased and the ride comfort can be improved with bushing tuning. The Watts linkage 50 also lowers the rear roll steer and roll center compared to a curved twist beam without a Watts linkage. Further, the Watts linkage, including the rocker arm and first and second link, are positioned rearward of wheel center on the trailing arms to provide space for the rear drive unit. The rearward position of the Watts linkage increases the understeer performance due to lateral forces from the rear wheels. Thus, the combination of the curved twist-beam member 44 and the Watts linkage 50 coupled to the trailing arms 46, 48 provide advantages in improving the performance of a rear wheel drive vehicle while reducing the cost, mass and complexity when compared to a typical independent suspension.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:
1. A vehicle comprising:
 a pair of rear wheels;
 a prop-shaft;
 a rear drive unit operably coupled between the prop-shaft and the pair of rear wheels, the rear drive unit being configured to transmit torque from the prop-shaft to the pair of rear wheels;

a twist-beam structure having a first trailing arm and a second trailing arm, each of the first trailing arm and the second trailing arm being operably coupled to one of the pair of rear wheels, the twist-beam structure further comprising a curved beam member extending between the first trailing arm and the second trailing arm, the curved beam member having a center portion offset from the prop-shaft;

a vehicle body;

a cross member coupled between the rear drive unit and the vehicle body;

a Watt linkage pivotally coupled to the cross member opposite the rear dive unit and positioned opposite the curved beam member from the rear drive unit, the Watt linkage having a first link coupled to the first trailing arm and a second link coupled to the second trailing arm, wherein a pivot axis of the Watt linkage is aligned with a prop-shaft axis; and wherein the pivot axis and the rear drive unit are vertically disposed between a bottom surface of the curved beam member and a surface the vehicle is positioned.

2. The vehicle of claim 1 wherein the Watt linkage further includes a rocker arm pivotally coupled to the cross member of the rear drive unit, wherein the first link is coupled between the first trailing arm and the rocker arm and the second link is coupled to between the second trailing arm and the rocker arm.

3. The vehicle of claim 2 wherein the rear drive unit is disposed at least partially between the cross member and the curved beam member.

4. The vehicle of claim 3 wherein the rocker arm is coupled to the cross member opposite the rear drive unit.

5. The vehicle of claim 4 wherein the rocker arm is centrally disposed on the cross member.

6. The vehicle of claim 5 wherein the rocker arm includes a first portion and an opposing second portion, the first link being rotationally coupled to the first portion and the second link being rotationally coupled to the second portion.

7. A suspension for non-steered wheels on a vehicle, the vehicle having a body and an engine, the vehicle further having a prop-shaft disposed between the engine and a rear drive unit, the suspension comprising:

a first trailing arm configured to mount to the body, the first trailing arm having a first portion on one side of a first mounting for a first non-steered wheel and a second portion on the opposing side of the first non-steered wheel from the first portion;

a second trailing arm configured to mount to the body, the second trailing arm having a third portion on one side of a second mounting for a second non-steered wheel and a fourth portion on the opposing side of the second non-steered wheel from the third portion;

a beam member coupled between the first portion and the third portion, the beam member having a curved shape with a center portion disposed away from a ground plane relative to ends of the beam member, the curved shape being sized to provide space for the prop-shaft to extend from the engine to the rear drive unit;

a cross member coupled to the body and positioned perpendicular to the first trailing arm and second trailing arm adjacent the beam member;

a Watt linkage pivotally coupled to the cross member by a pivot having an axis aligned with a prop-shaft axis, the Watt linkage being coupled to the cross member on a side opposite the rear drive unit, the Watt linkage having a first link rotationally coupled to the second portion and a second link rotationally coupled to the fourth portion; and wherein the pivot and rear drive unit are vertically disposed between a bottom surface of the beam member and a surface the vehicle is positioned.

8. The suspension of claim 7 wherein the Watt linkage includes a rocker arm operably coupled to the body, the rocker arm being coupled to the first link and the second link.

9. The suspension of claim 8 wherein the Watt linkage is disposed offset from the beam member.

10. The suspension of claim 9 wherein the rear drive unit is disposed between the beam member and the Watt linkage.

11. The suspension of claim 10 further comprising a first spring support member coupled to the beam member and the first portion.

12. A vehicle comprising:

a body;

an engine operably coupled to the body;

a pair of rear wheels;

a prop-shaft coupled to receive torque from the engine;

a rear drive unit disposed between the prop-shaft and the pair of rear wheels, the rear drive unit being configured to transfer torque from the prop-shaft to the pair of rear wheels;

a twist-beam suspension operably coupled to the body, the pair of rear wheels and the rear drive unit, the twist-beam suspension having a first trailing arm, a second trailing arm and a curved beam member disposed therebetween, the curved beam member being shaped to define a space for the prop-shaft to couple to the rear drive unit, the twist-beam suspension further including a Watt linkage having a first link coupled to the first trailing arm and a second link coupled to the second trailing arm;

a cross member coupled to the body;

wherein the Watt linkage is pivotally coupled to the cross member by a pivot having an axis aligned with a prop-shaft axis, the Watt linkage being coupled to the cross member opposite the rear drive unit; and wherein the pivot and rear drive unit are vertically disposed between a bottom surface of the curved beam member and a surface the vehicle is positioned.

13. The vehicle of claim 12 wherein the rear drive unit is coupled to the cross member.

14. The vehicle of claim 13 wherein the Watt linkage includes a rocker arm pivotally coupled to the cross member, the first link coupled between the first trailing arm and the rocker arm, the second link being coupled between the second trailing arm and the rocker arm.

15. The vehicle of claim 14 wherein the rocker arm is coupled to the cross member opposite the rear drive unit.

16. The vehicle of claim 15 wherein the rocker arm is arranged centrally between the first trailing arm and the second trailing arm.

* * * * *